Dec. 13, 1949   H. L. McADOO   2,491,050
DENTAL CLAMP
Filed Oct. 1, 1946
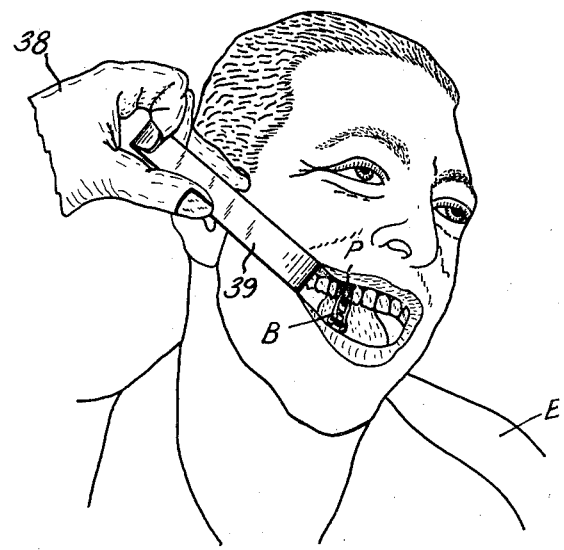
Fig. I.
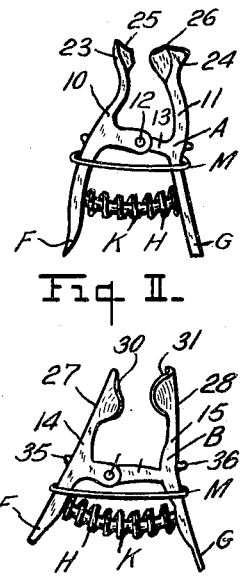
Fig. II.
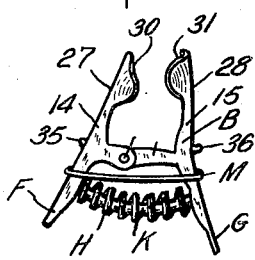
Fig. III.
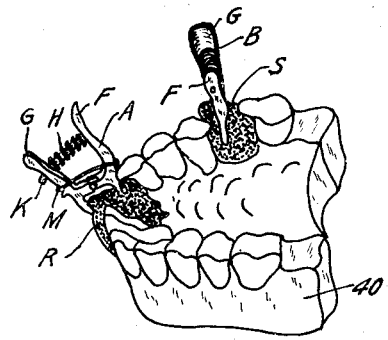
Fig. IV.
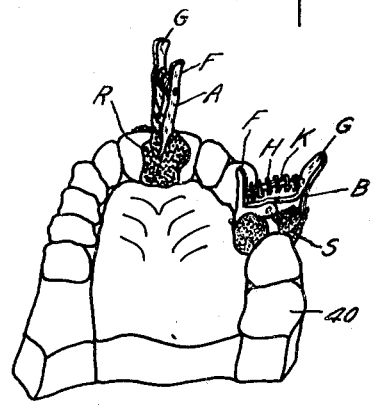
Fig. V.
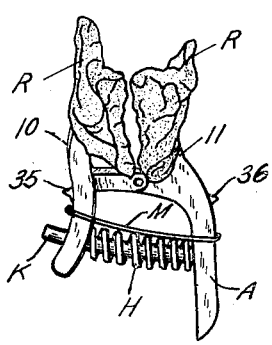
Fig. VI.
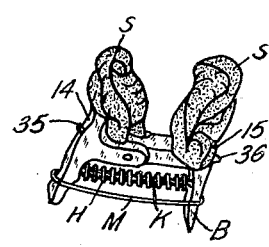
Fig. VII.
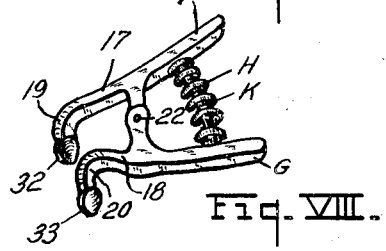
Fig. VIII.
INVENTOR.
HAROLD L. McADOO.
BY Joseph B. Lindecker
ATTORNEY.

Patented Dec. 13, 1949

2,491,050

UNITED STATES PATENT OFFICE 2,491,050

DENTAL CLAMP

Harold L. McAdoo, Bartlesville, Okla.

Application October 1, 1946, Serial No. 700,448

1 Claim. (Cl. 128—346)

This invention relates broadly to dental instruments and more especially to improvements in small clamps for holding wet or green tooth fillings in place in tooth cavities, and also for taking plastic impressions of teeth or a portion of a tooth with modeling compound associated with the clamp jaw end portions thereof.

One object of the invention is to provide a small dental clamp substantially of H shape configuration, consisting of a pair of metal arms or levers hinged together, and with handle portion adapted to be manipulated by the thumb and forefingers of the operator, and with the operative jaws at the opposite end thereof which are suitably shaped to form pressure and modeling plates.

Another object is to provide a dental clamp having a pair of arms or levers pivoted together at an off center pivot point and provided between one end thereof with a spring, tending to force the opposite jaw ends thereof together for imparting a spring pressure upon the material retained between the teeth and said jaw ends, and further provided with a sliding link or yoke which embraces and is retained adjustably upon the levers for locking the levers to cause them to hold the handle portions from spreading apart and allowing the jaw ends to close, thereby destroying the impressions formed in the modeling compound upon the jaw end portions thereof.

Another object of the invention is to provide a small dental clamp, reduced to such proportions as to permit it to be inserted in the open mouth of the patient and adjusted over any of his teeth; the jaw ends of the clamps having modelling plates incorporating wedge-shaped flanges to fit between teeth, or incorporating concave member to obtain the entire contour of a single tooth.

Another object of the invention is to provide a small dental clamp provided with its jaw end portions thereof curved downwardly to facilitate their use in the patient's mouth, the handle portions being in a horizontal position while the jaws are in a vertical position when in engagement with the teeth or tooth needing treatment.

Another object of the invention is to produce a dental clamping device for use whereby cavities requiring to be filled with a synthetic filling, composition, or other material may be clamped with spring pressure until the filling hardens or sets, and during that time the modeling compound associated with the jaws prevents saliva from descending into said cavity.

Another object of the invention is to produce a dental clamping device for use whereby an impression of a cavity, in a tooth may be taken which requires a gold inlay; the modeling compound is placed upon the jaws of the novel clamp and then applied to the tooth with the cavity and the compound is forced into said cavity by spring pressure whereby a perfect impression is obtained.

Another object of the invention is to construct a small dental clamp, or set of dental clamps of various sizes, each of said clamps embodying a pair of levers of dissimilar configuration, each of said levers having jaws at one end thereof and said centrally extending arms being of unequal length pivoted together at an off-center pivot point, said arms forming acute angles with the lever portions embodying the jaws, said clamp being economical to manufacture, durable, and which are made of a material whereby the entire clamp may be sterilized without disassembling the component parts thereof.

Further objects and advantages are within the scope of this invention such as relate to the arrangement, operation and function of the related elements of the structure, to various details of construction and to combination of parts, elements per se, and numerous other features as will be apparent from a consideration of the specification and drawing of a form of the invention which may be preferred, in which:

Figure I is a perspective view of the dental clamp upon a tooth and disposed within the patient's mouth showing its practical application.

Figure II is a view in elevation of a dental clamp having its jaws formed with wedge-shaped flanges.

Figure III is a view in elevation of a dental clamp having its jaws formed with concave plates.

Figure IV is a perspective view showing a master model of a denture with two dental clamps applied thereto.

Figure V is a perspective view of the same master model of a denture and the clamps as shown in Figure IV, but now showing a rear view thereof.

Figure VI is a view in elevation of the clamp shown in Figures II, IV and V with modeling compound thereon, and after it has been removed from contact with two front teeth, and showing a perfect impression thereof.

Figure VII is a view in elevation of the clamp as shown in Figures III, IV and V with modeling compound thereon, and after it has been removed from contact with a molar and showing a perfect impression or contour thereof.

Figure VIII is a perspective view of a modified type of a novel dental clamp provided with its jaw end portions thereof curved downwardly and with handle portions arranged at a right angle thereto.

In the drawing like letters and number of reference indicate corresponding parts in the different figures.

Referring particularly to Figures I, II and VIII, A, B and C represent three forms of this improved dental clamp. Clamp A consists of a pair of substantially T-shaped levers 10 and 11 with arm extensions 13 of unequal length, said arms are pivotally connected together by rivet 12. Clamp B consists of a pair of substantially T-shaped levers 14 and 15, with arm extensions 13 of unequal length, said levers are pivotally connected together by rivet 16. Clamp C consists of a pair of T-shaped levers 17 and 18 with downwardly curved jaw end portions 19 and 20 with arm extensions 13 of unequal length, said arms pivotally connected together by rivet 22. Clamps A and B are small and of such reduced proportion as to permit them to be inserted completely and disposed within the open mouth of the patient E and adjusted over any of his teeth in a vertical position by the manipulation of the thumb and forefingers of the operator. Clamp C is also of reduced proportions and can be used and disposed within the mouth of the patient, the jaws 19 and 20 being in vertical engagement with a tooth while the arms 17 and 18 may assume a horizontal position above or below said tooth and adjacent teeth.

The clamps embodying levers of dissimilar configuration, each of said levers having a centrally extending arm, said arms being of unequal length and pivoted together at an off-center pivot point whereby one lever works at a greater distance from said point than the other, said levers equipped with jaws having molding plates of different contours arranged therewith. Clamp A has jaws 23 and 24 having modeling plates incorporating wedge-shaped flanges 25 and 26. Clamp B embodies jaws 27 and 28 having modeling plates with recesses or cups 30 and 31 adapted to retain a plastic compound therein while an impression of a tooth is being obtained. Clamp C has jaws 19 and 20 which embody cups 32 and 33 similar to cups 30 and 31; however said cups 32 and 33 may be made similar to plates 25 and 26 if so desired. All the clamps shown in the figures of this drawing embody handle portions F and G of desired configuration; said configuration being such that the arm extensions 13 form acute angles with the portion of the levers embodying said jaws. Between the handle portions is located a compression spring H which tends normally to expand the outer ends of the handle portions F and G, and thus cause the jaws to firmly grip the tooth or teeth with which they are engaged, as clearly shown in Figures I, IV and V. Said spring H is held in position by pin or member K one end thereof being secured to one of said handle portions, while the opposite end of the pin is adapted to slide through an opening in the opposite handle portion thereby allowing the spring H to be compressed when handle portions F and G are moved towards each other, to open the jaws, clearly shown in Figure VI. The arms are provided with a sliding link or yoke M which embraces and is retained adjustably thereon and is prevented from slipping down over the jaws by projections 35 and 36 on the arms. The purpose of the link is to maintain the handles contracted, spring compressed, and jaws apart as clearly shown in Figures VI and VII, said link further preventing destruction of the impression formed in the modeling compound as explained later herein.

In order to clearly show the practical application of this novel clamp, Figure I shows the dental clamp A disposed within the patient's mouth, the clamp in vertical position and having modeling compound P in contact with an upper molar, an impression being taken while the dentist 38 holds or inserts a retractor or suitable instrument 39 adapted for use for the purpose of holding a patient's mouth or jaw in open position. In Figures IV and V the clamps A and B are shown in position upon a master model of a denture 40 to clearly show how the clamps force the modeling compound R and S respectively in and about the teeth and in contact with the gums to prevent saliva from descending into a cavity being prepared for filling with suitable material. Figure VI shows the clamp A removed from the master model 40, the link M is holding the jaws 23 and 24 apart so as to allow the modeling compound R to set or harden. Figure VII shows the clamp B removed from the master model 40, the link M is holding the jaws 27 and 28 apart so as to allow the modeling compound S to harden and form a perfect impression.

The improved dental clamp disclosed herein may be used for the purpose of holding wet or green tooth fillings or inlays in place in tooth cavities, and with modeling compound associated with the jaws of the clamps in tight contact in and around the teeth the saliva is prevented from descending into the cavities during the operation of filling said cavities.

Heretofore, it has been customary to prevent the descent of saliva into a cavity, which will cause the filling to be useless when applied, by applying a rubber dam having a hole therein, which is sprung around the neck of the tooth, the sides projecting all around and outside the mouth to form a protecting-roof and guide the saliva into other channels. This is disagreeable and troublesome both to the dentist and the patient, and is not always satisfactory for the desired purpose.

Heretofore it has also been customary for the dentist to hold the filling or inlay in place with his finger or fingers and thumb during the operation of filling a cavity. Dental manufacturers have endeavored for sometime, without success, to develop a practical contrivance for the performance of this function. With this novel dental clamp it is now possible to construct on the modeling plates on the jaw ends of the clamp and with modeling compound lined with Celluloid, or cellophane, or the like, an exact mould or impression of the tooth to be filled. After the cavity is properly prepared for filling, a temporary stopping of wax is placed within said cavity. Then the modeling compound is placed upon the jaws of the clamp, after which the dental clamp with heated moulding compound thereon is placed in engagement with said tooth with the temporary wax stopping to get the shape of the natural form of the tooth. After the compound has chilled the dental clamp and chilled compound are then released and lifted from the tooth as a unit, after which said link M is placed in desired position to lock said handle portions from spreading and allowing the jaws to close, thus preventing destruction of the impression formed in the modeling compound. After the modeling compound has chilled or set, the wax stopping in the cavity within the tooth can be removed. The cavity in the tooth is again prepared and a permanent synthetic filling or alloy, can then be placed within said cavity. A piece of Celluloid or cellophane is then placed over said filling, or alloy, the clamp and mold replaced upon the tooth and allowed to remain in place to press the filling in place under spring pressure, the modeling compound completely covering the portions of the tooth adjacent the cavity thus preventing any saliva from descending into or near said cavity during the operation of filling the same. By this method the dentist does not need to be near the patient or does he need to apply a rubber dam about the tooth.

When the synthetic filling has set the dental clamp and Celluloid strip are removed, said Celluloid providing a polished finish on the outer surface of the tooth and filling. No further grinding of the outer surface of the filling is required, and by first taking the impression of the tooth with the wax in the cavity, the final filling has the exact contour of the original filling, and has been pressed in place under spring pressure without moisture or saliva in contact therewith during the final period of set.

This novel clamp may be made with removable molding plates, or several clamps may be made to complete a set of clamps, each clamp having molding plates of different contours. Some may be made with plates having wedge-shaped flanges in the center to fit between teeth; or some plates may be made to conform roughly to the contour of the sides of a tooth. These plates form the frame work upon which an exact impression of the tooth can be obtained with the modeling compound associated therewith. By the use of this novel dental clamp satisfactory synthetic fillings, or gold inlays, may be obtained.

While the invention has been described in detail, and the foregoing description was necessary in order that the invention may be completely set forth, it is to be understood that the invention is not to be confined to the exact construction described, that various re-arrangements of parts and modifications of detail may be made without departing from the spirit of the invention.

What I claim as my invention is:

A thumb and finger actuated dental clamp of H shape configuration and of such proportions as to permit it to be inserted and entirely confined within the open mouth of a patient, said clamp embodying a pair of levers of dissimilar configuration, each of said levers having a centrally extending arm, said arms being of unequal length, said arms pivoted together at an off-center pivot point whereby one lever works at a greater distance from said pivot point than the other, said levers having fixed jaws at one end thereof, said arms constructed to form an acute angle with the portion of said levers embodying said jaws, said levers having handles formed at the opposite ends thereof, and a spring suitably arranged with said handles whereby said jaws may be maintained in open position when desired.

HAROLD L. McADOO.

REFERENCES CITED

The following references are of record in the file of this patent:

UNITED STATES PATENTS

| Number | Name | Date |
|---|---|---|
| 388,619 | Booth | Aug. 28, 1888 |
| 575,894 | Keefe | Jan. 26, 1897 |
| 2,267,836 | Parkin | Dec. 30, 1941 |

FOREIGN PATENTS

| Number | Country | Date |
|---|---|---|
| 15,762 | Great Britain | Aug. 3, 1901 |